Aug. 16, 1932.  S. O. WHITE  1,872,566

TRANSMISSION GEAR SHIFTER

Filed Jan. 9, 1932  2 Sheets-Sheet 1

INVENTOR.
Samuel O. White,
BY
Hood + Hahn
ATTORNEYS

Aug. 16, 1932.   S. O. WHITE   1,872,566
TRANSMISSION GEAR SHIFTER
Filed Jan. 9, 1932   2 Sheets-Sheet 2
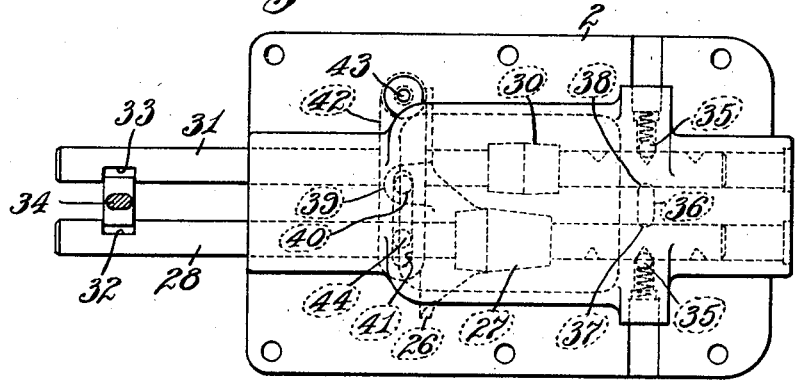
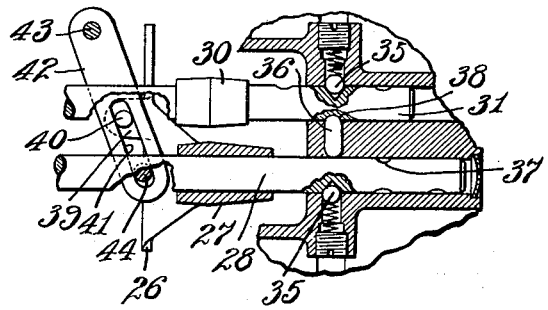
INVENTOR.
Samuel O. White,
BY
Hood + Hahn.
ATTORNEYS Patented Aug. 16, 1932

1,872,566

UNITED STATES PATENT OFFICE

SAMUEL O. WHITE, OF MUNCIE, INDIANA, ASSIGNOR TO WARNER GEAR COMPANY, OF MUNCIE, INDIANA, A CORPORATION OF INDIANA

TRANSMISSION GEAR SHIFTER

Application filed January 9, 1932. Serial No. 585,664.

My invention relates to improvements in transmission mechanism for automobiles and particularly to the shifting mechanism therefor.

In certain types of transmissions it is sometimes desirable to increase the force applied to one set of shiftable members as compared with the other set without varying the degree of force applied by the operator to the shift lever of the transmission.

In certain types of transmission mechanism wherein means are provided for synchronizing certain of the gears of the transmission such synchronizing means frequently require a greater application of pressure than those gears which are not provided with synchronizing means. In order that the "feel" of the shift lever to the operator under these circumstances may be the same irrespective of the gears being shifted it is sometimes desirable to increase the force applied to the synchronizing devices by means interposed between the shift lever and the synchronizing device.

My shifting mechanism is particularly applicable to this type of transmission.

For the purpose of disclosing my invention I have illustrated one embodiment thereof in the accompanying drawings, in which:

Fig. 2 is a plan view thereof, the shift lever being shown in section;

Fig. 4 is a detail view showing more particularly the lever or link mechanism.

Figure 1:
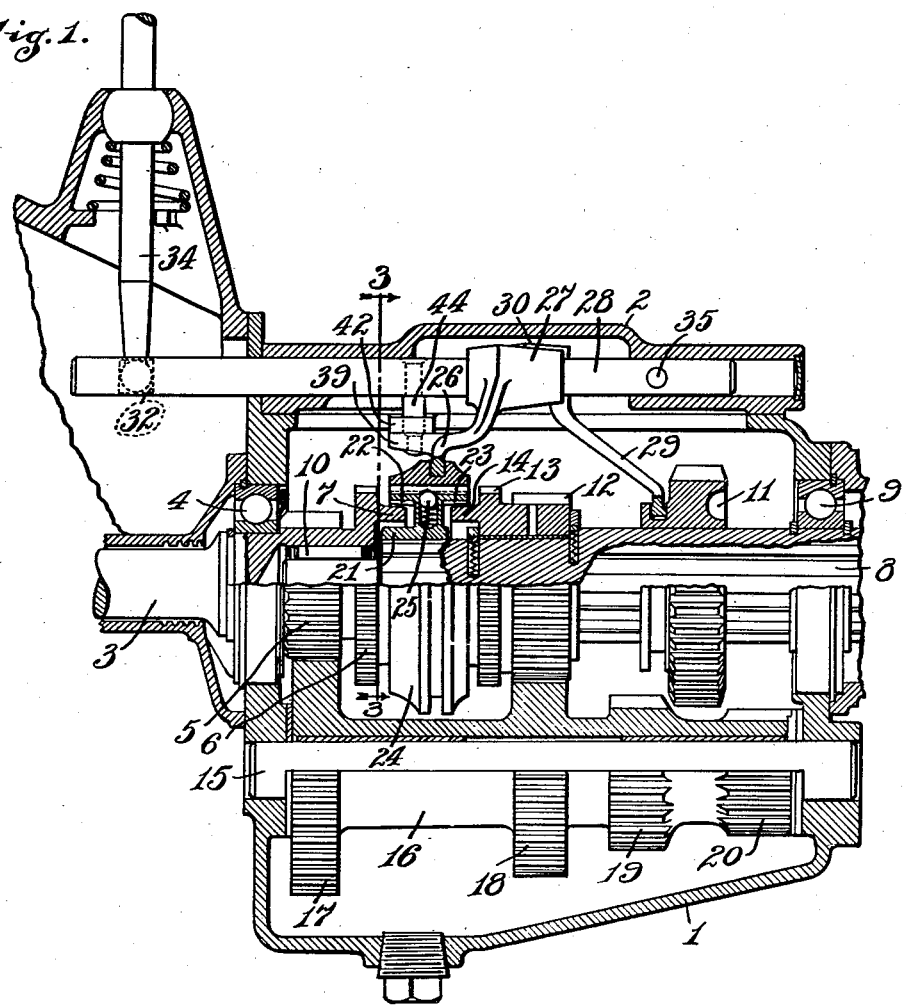
Fig. 1 is a longitudinal sectional view of a transmission embodying by invention.
Figure 3:
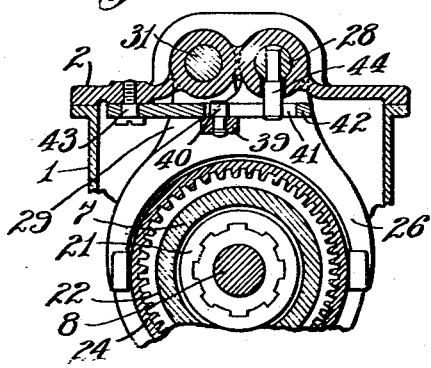
Fig. 3 is a sectional view taken on the line 3—3 of Fig. 1.

In the embodiment of the invention illustrated in the drawings I show a transmission including the usual transmission casing 1 provided with a top or cover 2. The driving shaft 3 extends through a front opening in the casing being mounted in suitable ball bearings 4 and is provided with a gear 5 and a series of gear clutch teeth 6, as well as an annular cone clutch flange 7.

The driven shaft 8 extends through the rear wall of the casing having suitable ball bearings 9 and at its front end is piloted in the driving shaft 3 in suitable roller bearings 10. This driven shaft has splinedly mounted thereon an axially shiftable gear 11 and a normally freely rotatable gear 12. The gear 12 is provided with gear clutch teeth 13 corresponding in construction to the clutch teeth 6 and with an annular cone clutch member 14 corresponding to the clutch member 7.

Mounted beneath the driving and driven shafts 3 and 8 is a counter-shaft 15 on which is rotatably mounted a spindle 16, having a gear 17 in constant mesh with the gear 5 and a gear 18 in constant mesh with the gear 12. This spindle is likewise provided with a low speed gear 19 for engagement with the gear 11 and a reversed gear 20, in constant mesh with a reversing idler (not shown), which idler is adapted to be meshed with the gear 11.

The clutches 13 and 6 and cone clutch members 7 and 14 provide a portion of a synchronizing clutch mechanism for direct drive between the shafts 3 and 8, or for second speed drive between the shafts 3 and 8. For cooperation with the above described structures, I provide a hub member 21 splined on the shaft 8 and having oppositely formed annular cone clutch members 22 and 23 for respective engagement with the cone members 7 and 14. Splinedly mounted on the periphery of this hub is a clutch ring 24, which is nonrotably associated with the hub 21 and the splined teeth of the clutch ring are adapted to mesh either with the teeth 6 or the teeth 13. The ring 24 is releasably connected to the hub 21 by a series of ball poppets 25 mounted in the hub and engaging in notches in the ring 24. This ring constitutes a shiftable member for the clutch mechanism and is provided with an annular groove adapted to receive a shifter fork 26 mounted on a hub 27 in turn slidably mounted on the shift rod 28. It is apparent that when the shift fork and with it the shift ring 24 are moved to the left, the cone clutch 22 will initially be engaged with the cone clutch member 7 on the shaft 3 thereby connecting the shafts 8 and 3 through a friction clutch to bring the speed of the shafts to synchronization. A continued movement of the ring 24 will disengage the friction poppets 25 releasing the ring 24 from the hub 21 and the splined teeth of the ring 24 meshing with the teeth 6 will positively connect the driving and driven shafts together. In the same manner the gear 12 may be connected to the shaft 8 for second speed drive.

For low and reverse speed drive the gear 11 is axially shifted on the shaft 8 and to this end the gear is operated by means of a shift fork 29, the hub 30 of which is mounted on and secured to the shift rail 31.

These shift rails 28 and 31 are provided in their opposed faces, respectively with shift notches 32 and 33 adapted, when the parts of the transmission are in neutral position to lie opposite one another. The lower end of a shift lever 34 may be moved by shifting the lever transversely to either of the notches 32 and 33 and then the rods shifted longitudinally by a shift of the lever forward or backward.

The rods 28 and 31 are maintained in their shifted positions through the medium of spring pressed poppets 35, one for each shift rod adapted to engage in suitable notches in the shift rods. For preventing movement of one shift rod when the other is moved to any other than neutral position, I provide an interlocking pin 36 transversely movable in a web into notches 37 and 38 on the respective shift rods. When the shift rods are in neutral position these notches are opposite one another so that, when one rod is shifted the movement of the pin out of the notch of this rod will move it into the notch of the opposite rod where it will be maintained so long as the rod is shifted out of neutral position.

The shift rod 31 is operated by direct engagement between the shift lever 34 and this rod. It will be noted that this shift rod is connected with the shift fork 29 for shifting the gear 11. The rod 28, it will be remembered, operates the shift fork 26, which is adapted for shifting the synchronizing and positive clutch members for high and second speed drive. In order to increase the leverage of the shift lever 34 on the shift fork 26, the hub 27 thereof is slidably mounted on the shift rod 28. This hub is provided with an extension 39 having an upwardly extending pin 40 operating in an elongated slot 41 in a lever 42 pivoted at 43 to the underside of the cover 2. This slot 41, at the extreme end of the lever has engaged therein a pin 44 extending downwardly from the shift rod 28. It is therefore, apparent that the shifting of the rod 28 back and forth will rock the lever 42 on its pivot 43 and this rocking movement will be transmitted to the slot 41 and pin 40 to the shifting fork thereby amplifying the leverage of the shift lever 34 whereby although the same pressure is applied to the shift lever 34 for operating the shifting fork 26 as for operating the shifting fork 29, this pressure in operating the shifting fork 26 is amplified to compensate for the increased pressure desirable for operating the synchronizing and clutch mechanism.

I claim the following:

1. A shift mechanism for transmissions, including a shift rod, a shift lever adapted for connection with said shift rod to move the same axially, a shifting fork axially movable on said shift rod, and a lever connection between said shift fork and rod constructed to multiply the shifting force imparted by said shift rod to said shift fork.

2. A shift mechanism for transmissions, including a shift rod, a shift lever adapted for connection with said rod to move the same axially, a shifting fork axially movable on said shift rod, and a lever connection between said shift rod and fork constructed to shorten the movement imparted by said rod to said fork.

3. A shift mechanism for transmissions, including a shift rod, a shift lever adapted for connection with said rod to shift the same axially, a shift fork supported by said rod, and a lever connection between said rod and fork constructed to multiply the shifting force imparted by said rod to said fork.

4. A shift mechanism for transmissions, including a shift lever, a shift fork, a lever pivoted at one end, means for establishing a connection between the opposite end of said pivoted lever and said shift lever, and means for connecting the shift fork to said pivoted lever between its pivot point and shift lever connection point.

5. A shift mechanism for transmissions, including a shift lever, a shift rod, a shift fork slidably mounted on said shift rod, a pivoted lever operatively connected with said shift lever, and means for connecting said shift fork for said pivoted lever at a point nearer its pivot point than the point of connection between said shift lever and said pivot lever.

6. A transmission, including a casing for variable speed gears and a cover for said casing, a shift fork supported from said cover, a shift lever, and a lever connection between said shift lever and fork supported from the cover and constructed to increase the shifting force imparted by said shift lever to said shift fork.

7. A transmission, including a casing for variable speed gears and a cover therefor, a shift rod mounted in said cover, a shift fork, a shift lever adapted for connection with said shift rod, and a lever connection between said shift rod and said shift fork supported from said cover and constructed to increase the shifting force imparted by said shift rod to said shift fork.

In witness whereof, I, S. O. White have hereunto set my hand at Muncie, Indiana, this 5th day of January, A. D. one thousand nine hundred and thirty-two.

SAMUEL O. WHITE.